(12) United States Patent     (10) Patent No.:   US 12,666,205 B2

Holt et al.      (45) Date of Patent:    Jun. 23, 2026

(54) TRANSDUCERS AND MANUFACTURING METHODS THEREOF

(71) Applicant: Tymphany HK Limited, Hong Kong (HK)

(72) Inventors: Andrew Trippier Holt, Taipei City (TW); Wen-Hong Wang, Taipei City (TW); Chia-Chien Chen, Taipei City (TW); Yi-Hui Hsiao, Taipei City (TW)

(73) Assignee: TYMPHANY HK LIMITED, Tsuen Wan (HK)

( * ) Notice: Subject to any disclaimer, the term of this patent is extended or adjusted under 35 U.S.C. 154(b) by 242 days.

(21) Appl. No.: 18/400,340

(22) Filed: Dec. 29, 2023

(65) Prior Publication Data

US 2024/0223956 A1     Jul. 4, 2024

Related U.S. Application Data

(60) Provisional application No. 63/436,210, filed on Dec. 30, 2022.

(51) Int. Cl.
| | |
|---|---|
| *H04R 9/04* | (2006.01) |
| *B29C 45/14* | (2006.01) |
| *B29L 31/34* | (2006.01) |
| *H04R 9/06* | (2006.01) |

(52) U.S. Cl.
CPC ....... *H04R 9/045* (2013.01); *B29C 45/14065* (2013.01); *B29C 2045/14131* (2013.01); *B29L 2031/3418* (2013.01); *H04R 9/06* (2013.01); *H04R 2209/024* (2013.01); *H04R 2400/11* (2013.01)

(58) Field of Classification Search
CPC .......... H04R 9/045; H04R 9/00; H04R 9/003; H04R 9/04; H04R 9/041; H04R 9/06; H04R 2400/11; H04R 2209/024; H04R 2209/00; B29C 45/14065; B29C 2045/14121; B29L 2031/3418
USPC ................................. 381/396, 398, 400, 405
See application file for complete search history.

(56) References Cited

U.S. PATENT DOCUMENTS

| | | | | |
|---|---|---|---|---|
| 2016/0088395 | A1* | 3/2016 | Popken | H04R 3/14 |
| | | | | 381/433 |
| 2016/0219353 | A1* | 7/2016 | Whitwell | H04R 7/045 |
| 2020/0107093 | A1* | 4/2020 | Lee | H04R 9/06 |
| 2020/0336838 | A1* | 10/2020 | Tabata | H04R 9/04 |

* cited by examiner

Primary Examiner — Ahmad F. Matar
Assistant Examiner — Sabrina Diaz
(74) Attorney, Agent, or Firm — MUNCY, GEISSLER, OLDS & LOWE, P.C.

(57) ABSTRACT

This application provides a transducer including: a bracket, a voice coil, and a connecting terminal. The bracket has a first hole located in the center area and a notch located in the edge area. The voice coil includes a body, two tinsel wires extend from the periphery of the body of the voice coil, and at least a part of the body of the voice coil is located in the first hole of the bracket. The connecting terminal has two first conductive pads. The two tinsel wires are respectively connected to the two first conductive pads. At least a part of the connecting terminal is located in the notch.

19 Claims, 7 Drawing Sheets

TRANSDUCERS AND MANUFACTURING METHODS THEREOF

CROSS-REFERENCE TO RELATED APPLICATIONS

This application claims priority of U.S. Provisional Application No. 63/436,210 filed on Dec. 30, 2022 under 35 USC § 119(e), the entire contents of which are hereby incorporated by reference.

BACKGROUND

Technical Field

The disclosure relates to loudspeakers, and specifically to electroacoustic transducers for loudspeakers and manufacturing methods thereof.

Related Art

The sound generation principle of the speaker mainly relies on the function of the magnetic circuit system and the voice coil. When current is input to the voice coil, the magnetic circuit system produces electromagnetic force, thereby driving the diaphragm component to act and produce sound. Therefore, the tinsel wires connecting the voice coil needs to be connected to a power source so that the voice coil can generate an electric field and then have an electromagnetic interaction with the magnetic circuit system.

Generally, transducers use a bracket (or a frame) to hold all parts (such as voice coil, damper, magnetic circuit system, etc.). Traditional voice coil leads (tinsel wires) need to be pulled out of the bracket, and require connection form the coil to a terminal, often involving an intricate and typically manual process that is prone to errors, so the manufacturing process is more complicated, resulting in higher costs.

SUMMARY

All examples and features mentioned below can be combined in any technically possible way. In one aspect, the present disclosure provides a transducer including a bracket, a voice coil, and a connecting terminal. The bracket includes a first hole located in the center area and a notch located at the edge. The voice coil includes a body and two tinsel wires extended from the body. At least a part of the body is located in the first hole. The connecting terminal includes two first conductive pads, and the two tinsel wires are connected to the two first conductive pads, respectively. At least a part of the of the connecting terminal is located in the notch.

In one embodiment, the notch includes a support piece. At least a part of the connecting terminal is placed on the support piece. Preferably, the notch includes a blocking wall disposed between the connecting terminal and the body of the voice coil for stopping inwardly movement of the connecting terminal. Thus, the connecting terminal is kept positioned on the support piece. Preferably, the blocking wall includes two indentations located at the upper edge thereof, and the two tinsel wires 11 pass through the two indentations respectively.

In some embodiment, the connecting terminal includes a board. One side of two opposite sides of the board is aligned with the edge area, and the other side is aligned with the blocking wall.

In another embodiment, a contact surface between the support piece and the connecting terminal and a horizontal plane forms an inclination angle, and the connecting terminal may be placed inclinedly.

In yet another embodiment, the connecting terminal includes a board and two second conducting pads. The two first conducting pads are disposed on one surface of two opposite surfaces of the board, and the two second conducting pads are disposed on the other one surface.

In yet another embodiment, the connecting terminal includes a board and two third conducting pads extending outwardly from the board.

In yet another embodiment, the transducer further includes a damper. The bracket includes a steady disposed below the edge area and between the first hole and the edge area, at least a part of the damper is placed on the steady, and the two tinsel wires of the voice coil are located above the damper.

Preferably, the bracket includes a plurality of second holes and a plurality of armrests staggered with each other. The plurality of second holes is located between the steady and the edge area, and the plurality of armrests is spaced apart along the steady.

In some different embodiments, the connecting terminal includes a board, two extension arms, and two fourth conducting pads. The two first conducting pads are located on the board. The two extension arms extend from two opposite side of the board respectively along the edge area. The two fourth conducting pads extend from the two extension arms respectively. The two extension arms are placed on the plurality of the armrest respectively, and the two fourth conducting pads pass through out of the plurality of the second holes respectively.

In another different embodiment, the connecting terminal includes a board, two extension arms, and two fourth conducting pads. The two extension arms extend from two opposite side of the board respectively along the edge area, and the two first conducting pads located at two ends of the two extension arms respectively. The two fourth conducting pads extend from the two extension arms respectively. The two extension arms are placed on the plurality of the armrest respectively, and the two fourth conducting pads pass through out of the plurality of the second holes respectively.

In yet another embodiment, each tinsel wire includes a first line segment, a second line segment and a third line segment, and an angle between the first line segment and the second line segment may be different from an angle between the second line segment and the third line segment. Preferably, at least one of the first line segment, the second line segment or the third line segment are fixed on the first conducting pad of the connecting terminal, and an angel between the extension directions of the third line segment and the first line segment is about 10 to 45 degrees.

In other aspect, the present disclosure provides a manufacturing method of a transducer. The transducer may be any embodiment as described above or any combination of above. The manufacturing method includes: electrically connecting the two tinsel wires to the two first conductive pads respectively; and vertically assembling the voice coil and the connecting terminal to the bracket. At least a part of the body is located within the first hole and at least a part of the connecting terminal is located in the notch.

Preferably, the STEP of vertically assembling the voice coil and the connecting terminal to the bracket may include: vertically placing the damper onto the steady; and vertically disposing the two tinsel wires on above of the damper.

In yet another embodiment, the STEP of vertically assembling the voice coil and the connecting terminal to the bracket may include: placing the two extension arms onto the plurality of armrests respectively; and passing the two fourth conducting pads through out of the plurality of second holes respectively.

BRIEF DESCRIPTION OF THE DRAWINGS

The present disclosure will become more fully understood from the detailed description given herein below for illustration only, and thus not limitative of the present invention, wherein.

DETAILED DESCRIPTION

Figure 1:
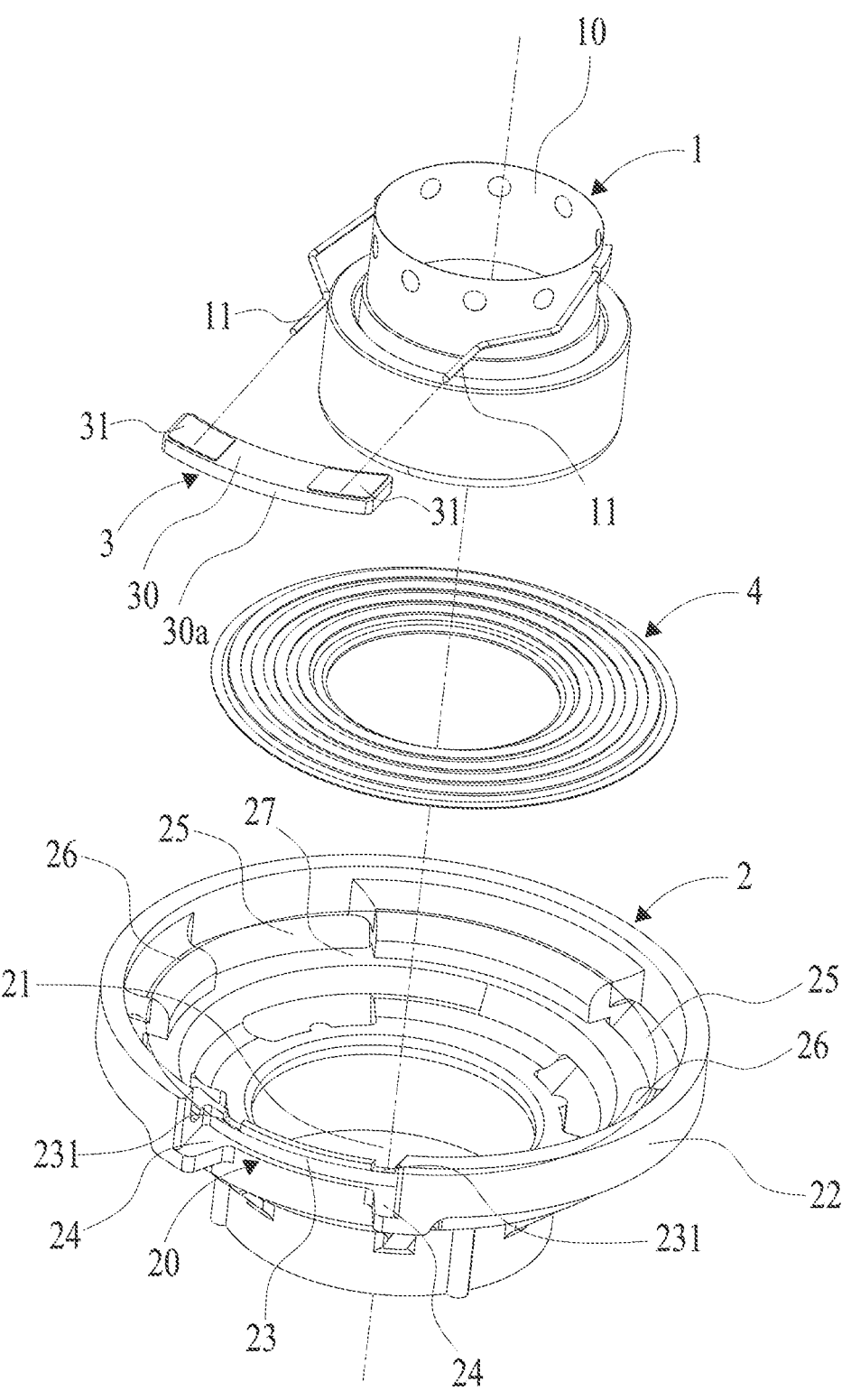
FIG. 1 is a exploded perspective view of the transducer in accordance with the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

In order to solve the problems of difficult assembly and time-consuming manufacturing process of speaker transducers in the prior art, the present application provides a transducer and a manufacturing method thereof, which are now described in detail through the following embodiments and in conjunction with the accompanying drawings. Reference in this application to "an embodiment" means that a particular feature, structure or characteristic described in connection with the embodiment may be included in at least one embodiment of the application. The appearances of the phrase "embodiment" in various places in the specification are not necessarily all referring to the same embodiment, nor are separate or alternative embodiments mutually exclusive with other embodiments. It will be understood by those skilled in the art that the embodiments described herein may be combined with other embodiments.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

In the description of this disclosure, it should be noted that, unless otherwise clearly stated and limited, the terms "installation", "connection" and "engagement" should be understood in a broad meaning. For example, "connection" or "engagement" of a mechanical structure may refer to a physical connection. For example, the physical connection may be a fixed connection, such as a fixed connection through a fastener, such as a fixed connection through screws, bolts or other fasteners. The physical connection may also be a detachable connection, such as mutually engaging connection. The physical connection can also be an integral connection; for example, welding, bonding or integrally forming a connection.

Please refer to FIG. 1. This disclosure provides a transducer includes a bracket 2, a voice coil 1, and a connecting terminal 3. The bracket 2, in its outer shape, is roughly two coaxial cylinders. The bracket 2 includes a first hole 21 located in the central area of the bracket 2. The bracket 2 includes a notch 20 located at the upper edge of the bracket 2. The notch 20 is penetrated throughout of the wall of one cylinder. The voice coil includes a body 10 and two tinsel wires (voice coil leads) 11 extended from the body 10. At least a part of the body 10 is located in the first hole 21. The connecting terminal 3 includes two (2) first conductive pads 31, and the two tinsel wires 11 are connected to the two (2) first conductive pads 31, respectively. At least a part of the connecting terminal 3 is located in the notch 20. For example, the connecting terminal 3 may be a PCB, and the two tinsel wires 11 are connected to the two (2) first conductive pads 31, such as by welding, for the electrically connection of power or signal. The connecting terminal 3 may be directly placed on the notch 20, thus the tinsel wires 11 of the voice coil 1 may be connected to the connecting terminal 3 by way of above of the bracket 2. This simplifies the assembly process.

In one embodiment, the notch includes a support piece 24, and at least a part of the connecting terminal 3 is placed on the support piece 24. The support piece 24 is like an inverted U shape with two protruding portion having a support plane.

In one embodiment, the notch 20 further includes a blocking wall 23. The blocking wall 23 is disposed between the connecting terminal 3 and the body 10 of the voice coil 1, and the blocking wall 23 is used for stopping the possible movement of the connecting terminal 3. Thus, the connecting terminal 3 may be positioned on the support piece 24, and the two tinsel wires 11 connected to the connecting terminal 3 cannot pull the connecting terminal 3 inwardly. Preferably, the height of the blocking wall 23 is greater than the thickness of the connecting terminal 3. The blocking wall 23 includes two indentations 231 located at the upper edge of the wall. The two tinsel wires 11 go through the two indentations 231 respectively. Please see FIG. 2. Normally, the two tinsel wires 11 are relative soft material, thus the two indentations 231 may be a socket for the two tinsel wires 11 disposed therein.

Figure 2:
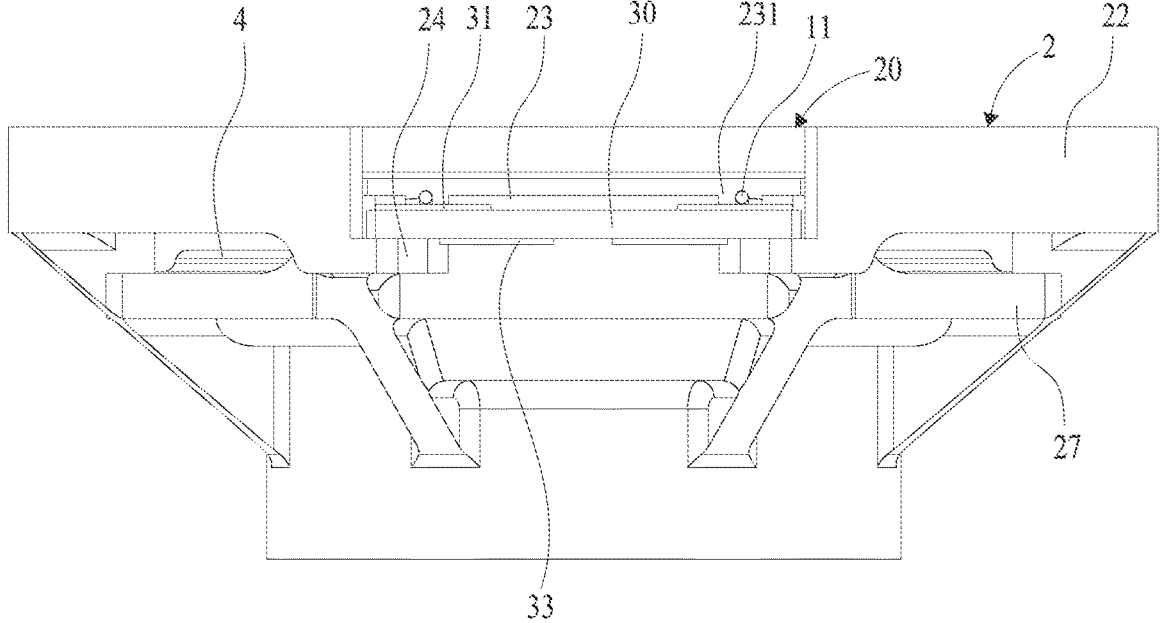
FIG. 2 is a front view of the transducer shown in FIG. 1 after assembly.

As shown in FIG. 2, in some embodiments, the connecting terminal 3 includes a board 30 and two (2) second conducting pads 33. The board 30 has two opposite surfaces (such as the upper and lower opposite surfaces as shown). For example, the two (2) first conducting pads 31 connected with the tinsel wire 11 of the voice coil 1 are located on the upper surface of the board 30, and the two (2) second conducting pads 33 are located on the lower surface of the board 30. Furthermore, the second conducting pads 33 can be designed with different sizes according to different needs. For example, the position of the second conducting pads 33 partially overlaps the first conducting pad 31, thus facilitating the conductive connection design of the circuit board. In one embodiment, at least one through hole (not shown) may be provided in the connecting terminal 3 where one first conducting pad 31 and one second conducting pad 33 are overlapped (called one paired conducting pad). The through hole is filled with conductive material, and the electrical material is connected to the first conducting pad 31 and the second conducting pad 33 respectively. Thus the one paired conducting pad (including one first conducting pad 31 and one second conducting pad 33) are electrically connected.

Figure 3:
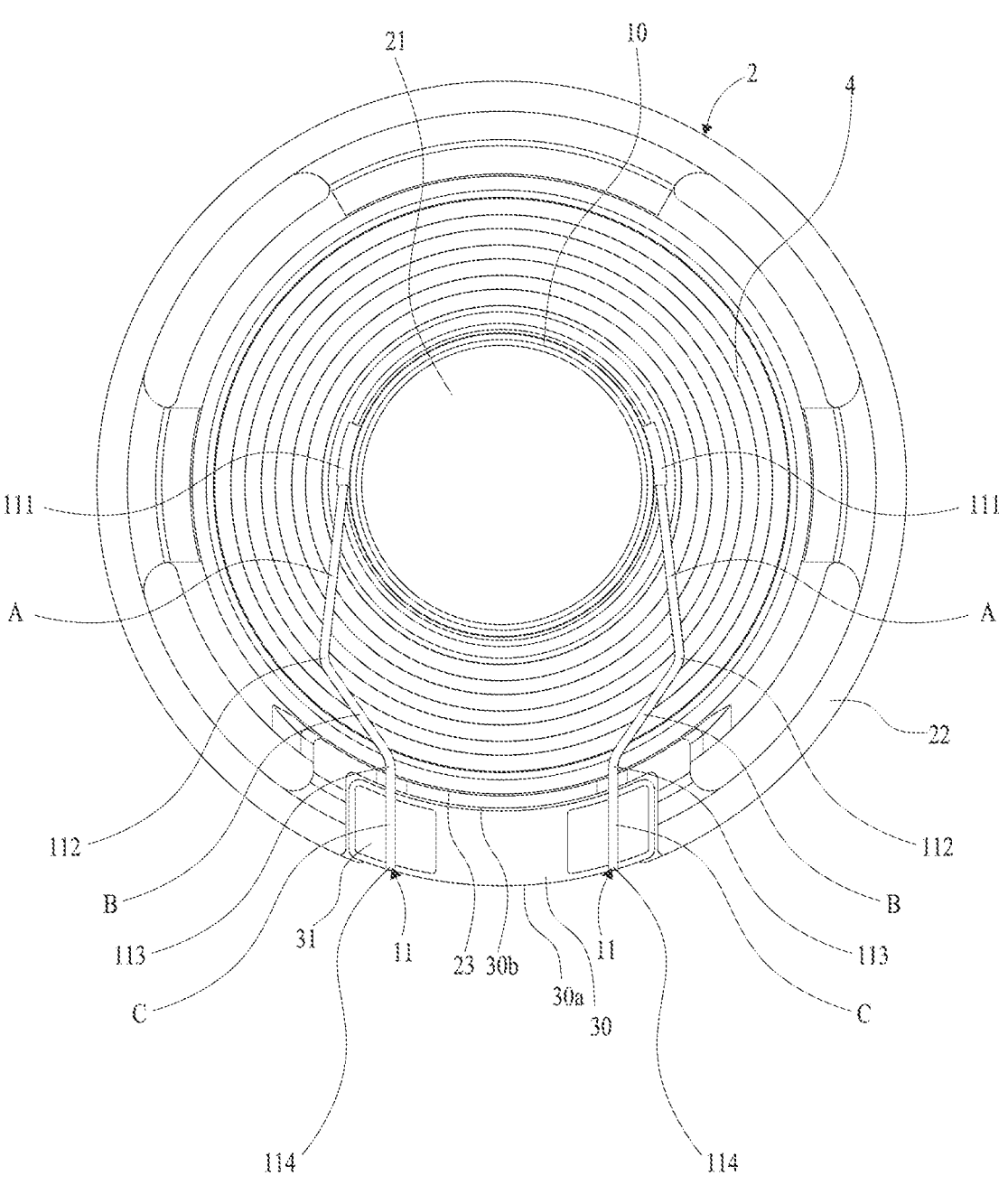
FIG. 3 is a top view of the transducer shown in FIG. 1 after assembly.

Please refer to FIG. 3. In some embodiments, the board 30 has two opposite sides 30a, 30b, one side 30a of which is aligned with the outer surface of the cylindrical wall of the edge area 22 to form a continuous surface, and the other side 33b is aligned with the blocking wall 23. In this embodiment, the board 30 of the connecting terminal 3 is generally meniscus-shaped, and the two opposite sides 30a and 30b are parallel to each other. In some implementations, each tinsel wire 11 includes at least three straight line segments, namely the first line segment A, the second line segment B and the third line segment C. The angle between the first line segment A and the second line segment B may be different from the angle between the second line segment B and the third line segment C. That is, the angle between the extension direction of each line segment and the horizontal line is different. The lengths of the first line segment A, the second line segment B, and the third line segment C may be the same or different from each other, or only partially the same. The horizontal distance between the end points 111 of the two (2) first line segments A is less than the horizontal distance between the two end points 112, and the horizontal distance between the end points 112 of the two (2) second line segments B is greater than the horizontal distance between the two end points 113, and the horizontal distance between the end points 113 of the two (2) third line segments C is equal to the horizontal distance between the two end points 114. Through the bending design of the line segment of tinsel wire 11, the overall support of tinsel wires 11 on the connecting terminal 3 can be increased. In one embodiment, the first line segment A of each tinsel wire 11 is parallel to the third line segment C, and the first line segment A and the third line segment C extend in the same direction, such as extending downward as shown in FIG. 3. In this embodiment, the horizontal distance between the end points 111 of the two (2) first line segments A is equal to the horizontal distance between the two end points 112, and the horizontal distance between the end points 113 of the two (2) third line segments C is equal to the horizontal distance between the two end points 114. In addition, the first line segment A, the second line segment B and the third line segment C of any one of the tinsel wire 11 may be integrally formed. Alternatively, any two line segments may be connected through a switching mechanism or junction mechanism (not shown).

Please refer to FIG. 1. The transducer further includes a damper 4. In some embodiments, the bracket 2 further includes a steady 27, and the steady 27 is located between the first hole 21 and edge area 22, which is below the edge area 22. At least part of the damper 4 is placed on the steady 27, and the two tinsel wires 11 of the voice coil 1 are located above the damper 4 (as shown in FIG. 3). The two tinsel wires 11 of the voice coil 1 may or may not contact with an upper surface of the damper 4; that is the two tinsel wires 11 may be located on above the damper 4 with a space or not.

Preferably, the bracket 2 includes a plurality of second holes 25 and a plurality of armrests 26. The plurality of second holes 25 are through holes and are staggered with the plurality of armrests 26. The plurality of second holes 25 is located between the steady 27 and the edge area 22. The plurality of armrests 26 are spaced apart along the steady 27.

Figure 4:
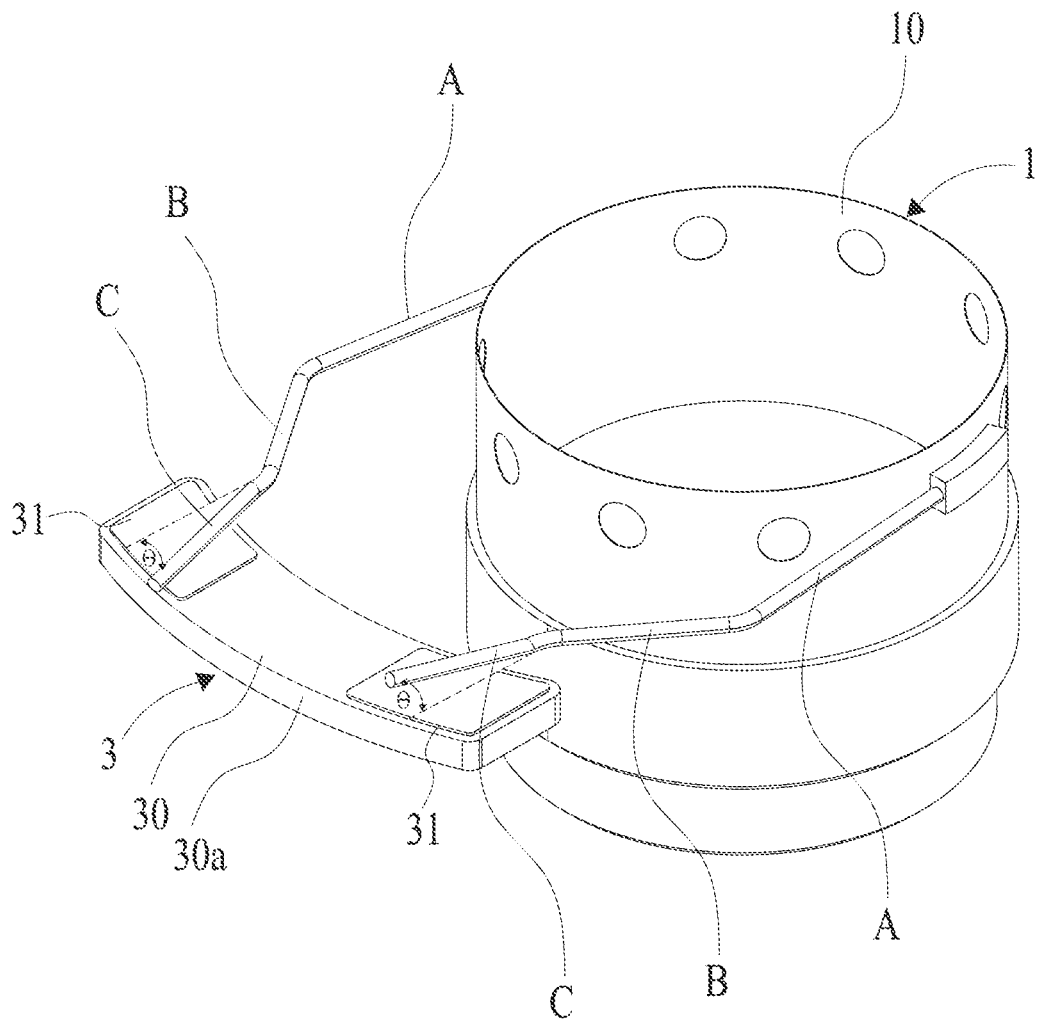
FIG. 4 is a perspective view of the voice coil and the connecting in accordance with the present disclosure.

Please refer to FIG. 4. In some embodiments, the front end of the tinsel wires 11 of the voice coil 1 can be fixed on the first conducting pads 31 of the connecting terminal 3 at an inclination angle θ. That is, the extension direction of the third line segment C of the tinsel wires 11 and the vertical direction (as shown by the dotted line or the extension direction of the first line segment A) forms an angle θ, where the angle θ is between 10 and 45 degrees. In some embodiments, the contact surface between the support piece 24 (as shown in FIG. 1) and the connecting terminal 3 is not a horizontal plane, but forms an inclination angle with the horizontal plane, or the contact surface between the support piece 24 and the connecting terminal 3 is a curved surface (not shown in the FIG. 1), whereby the connecting terminal 3 can be placed tilted relative to the horizontal plane instead of horizontally, which can ease the deformation of the tinsel wires 11 and provide more firmly support.

Figure 5:
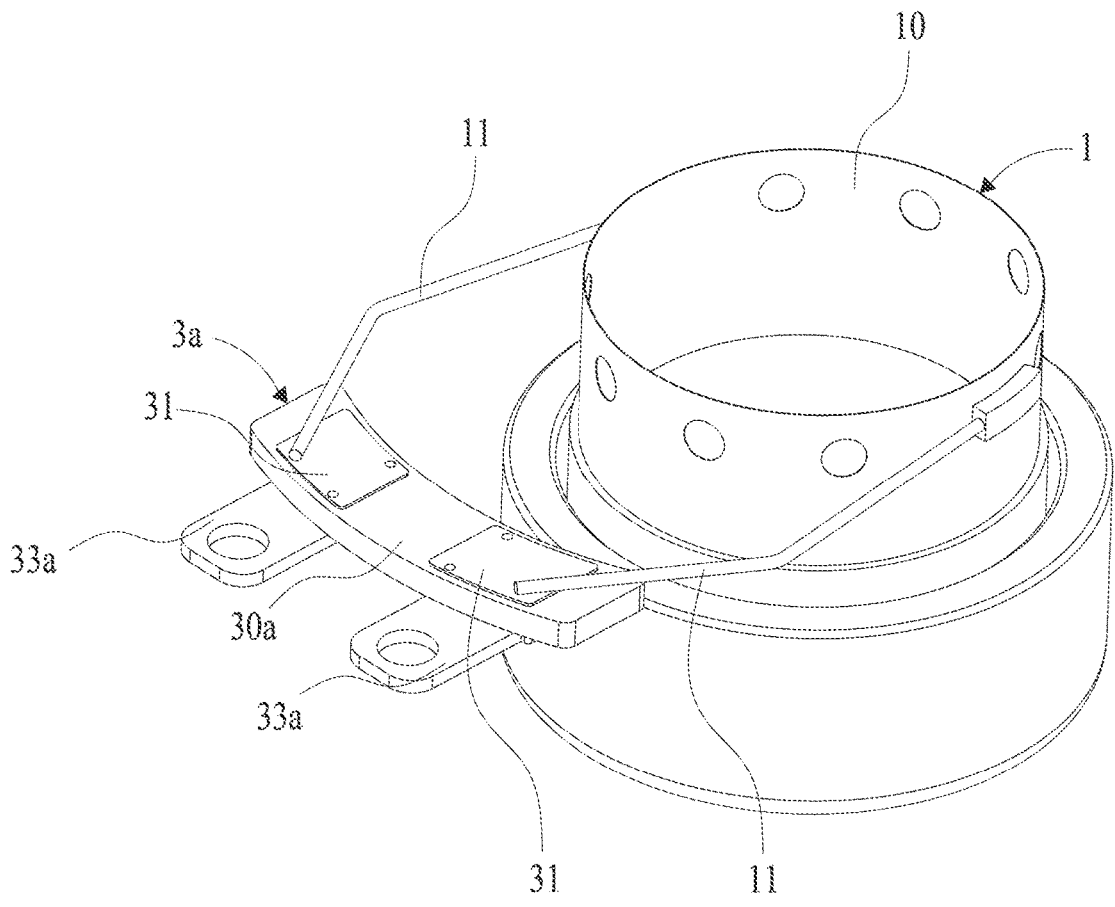
FIG. 5~7 are perspective views of the voice coil and the connecting showing different embodiments in accordance with the present disclosure.

In the embodiment of FIG. 2, the two (2) second conducting pads 33 are located on the lower surface of the board 30. However, in some other embodiments, the conducting pads may have various possible variations. For example, please refer to FIG. 5. The connecting terminal 3a includes two (2) third conducting pads 33a extending outward from the board 30a. In this embodiment, the protruding third conducting pad 33a can be designed with a contact hole, so as to externally connect with a screw or a stud (not shown). To simplify the explanation, please refer to FIG. 5~7 which only show with the voice coil and connecting terminal.

Figure 6:
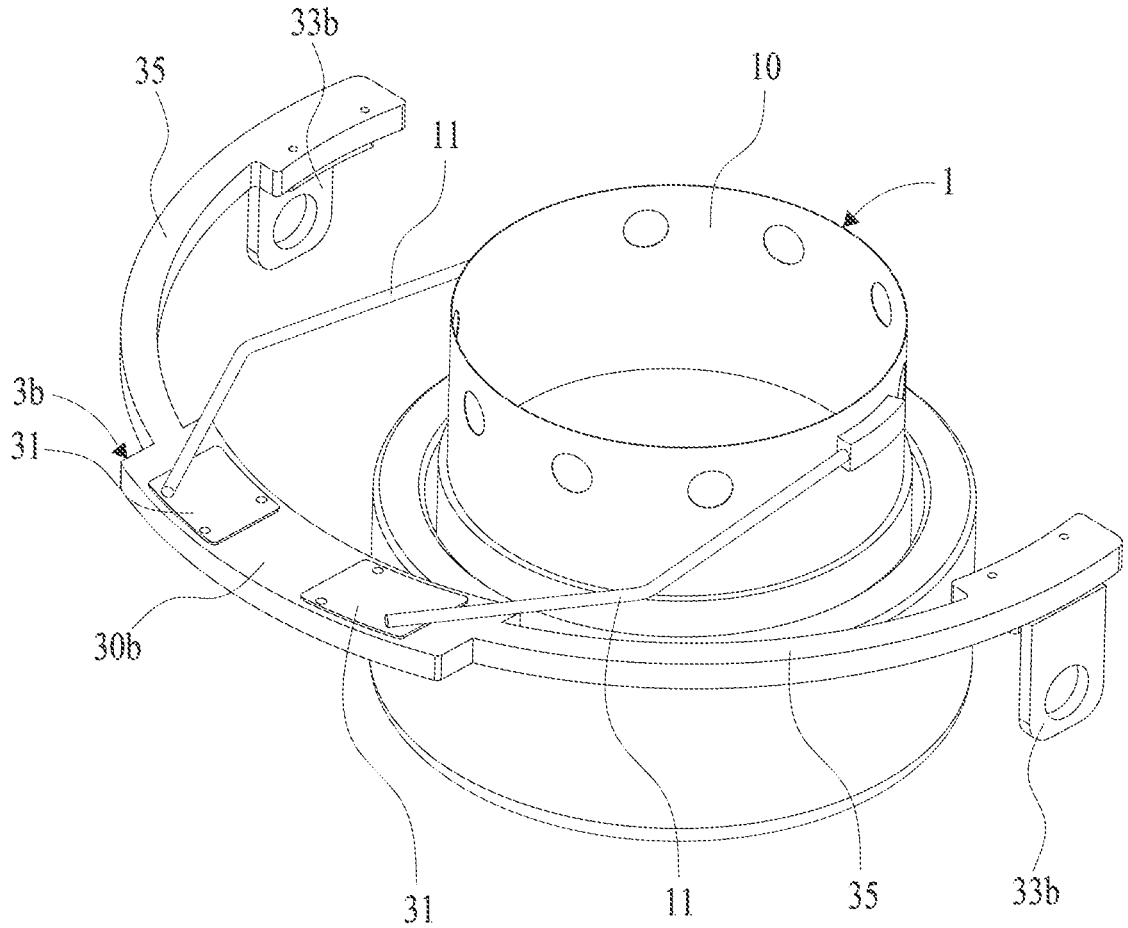

Please refer to FIG. 6. In some different embodiments, the connecting terminal 3b includes a board 30b, two extension arms 35 and two (2) fourth conducting pads 33b. The two extension arms 35 are respectively extended from the two opposite sides of the board 30b along the edge area 22. The two extension arms 35 are respectively placed on the armrest 26. In this embodiment, in order to cope with different connection positions, the two (2) fourth conducting pads 33b can be extended from the ends of the two extension arms 35 respectively, and the two (2) fourth conducting pads 33b pass through the corresponding second holes 25 respectively. The two (2) first conducting pads 31 are still located on board 30b. The two (2) first conducting pads 31 are electrically connected to the fourth conducting pad 33b on the extension arm 35 through wires located on the connecting terminal 3b respectively. The main body of each fourth conducting pad 33 extends vertically downward from the horizontal surface of the extension arm 35, that is, the main body of the fourth conducting pad 33 is perpendicular to the horizontal surface of the extension arm 35.

Figure 7:
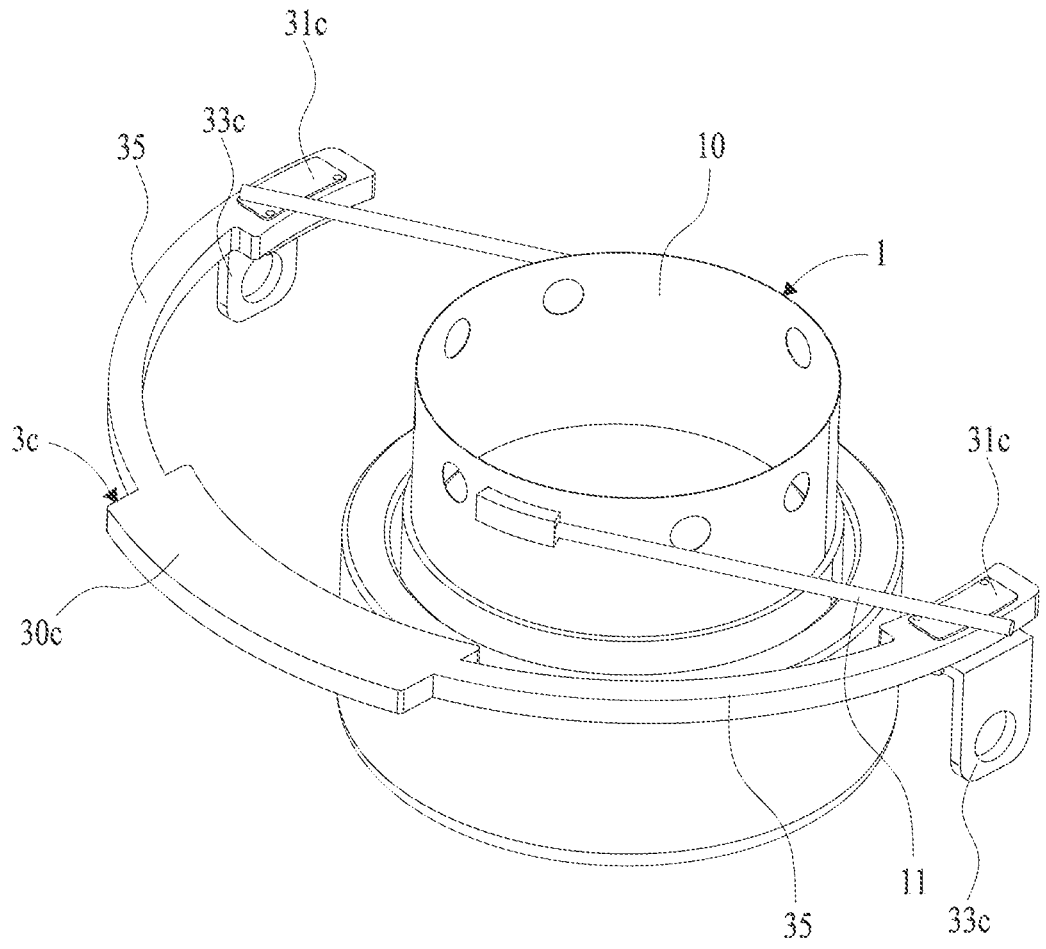

Please refer to FIG. 7. In some different embodiments, the connecting terminal 3c includes a board 30c, two extension arms 35 and two (2) fourth conducting pads 33c. The two extension arms 35 are respectively extended from two opposite sides of the board 30c along the edge area 22, and two (2) fourth conducting pads 33c are respectively extended from the two extension arms 35. The two (2) first conducting pads 31c are respectively located at the ends of the two extension arms 35. Similar to FIG. 6, the two extension arms 35 are placed on armrest 26 of bracket 2 respectively, and the two (2) fourth conducting pads 33c pass through the second holes 25 of bracket 2 respectively. The two (2) first conducting pads 31 are electrically connected to the two (2) fourth conducting pads 33c on the extension arm 35 through the wires on the connecting terminal 3c respectively. The two tinsel wires 11 respectively extend outward from the voice coil 1 in two different directions to the left and right for electrically connecting to the corresponding first conducting pads 31. The two (2) fourth conducting pads 33c and the two (2) first conducting pads 31 are respectively located on the upper and lower surfaces of the extending arm 35, and at least partially overlap each other in the horizontal direction. In one embodiment, at least one through hole (not shown) is provided in the extending arm 35 at the overlap, and the through hole may be filled with conductive material. The conductive material and the fourth conducting pad 33c are electronically connected to the first conducting pad 31, so that the fourth conducting pad 33c and the first conducting pad 31 are electrically connected. In one embodiment, the connection points of the two tinsel wires 11 on the voice coil 1 are located at both ends of the diameter of the voice coil 1 respectively. The main difference between the embodiments of FIG. 7 and FIG. 6 is that the first conducting pad 31c is located at the end of the extension arm 35, and the two tinsel wires 11 extend outward from the voice coil 1 in different left and right directions. In other words, this disclosure can be designed for the conducting pads with different electrical connection positions according to the wires or external connection locations.

In another aspect, this disclosure provides a manufacturing method of a transducer. The transducer can be various embodiments as described above, or any combination of above embodiments. Please refer to FIG. 1. The manufacturing method includes: STEP 1: electrically connecting the two tinsel wires 11 of the voice coil 1 to the two (2) first conducting pads 33 respectively; and STEP 2: vertically assembling the voice coil 1 and the connecting terminal 3 to the bracket 2. At least a part of the body 10 is located in the first hole 21, and at least a part of the connecting terminal 3 is located at the notch 20.

Preferably, the STEP of vertically assembling the voice coil 1 and the connecting terminal 3 to the bracket 2 further includes: first vertically placing the damper 4 onto the steady 27 of the bracket 2 from top to bottom, and then passing the body 10 of the voice coil 1 through the central hole of the damper 4 and leaving the two tinsel wires 11 on above the damper 4. The connecting terminal 3 is placing from top to bottom through the notch 20 on the cylindrical wall of the edge area 22 of the bracket 2, and the voice coil 1 and the connecting terminal 3 are vertically assembled into the first hole 21 and the notch 20 of the bracket 2 respectively, that is, both the connecting terminal 3 and the voice coil 1 are placing from top to bottom through the notch 20 and the first hole 21 respectively, and then the two tinsel wires 11 are located above the damper 4. In an embodiment, the tinsel wires 11 are located above the damper 4 with a space, and in other embodiment, at least a part of the tinsel wires 11 is contacted with the upper surface of the tinsel wires 11 without space.

Preferably, referring to FIG. 1, the STEP of electrically connecting the two tinsel wires 11 of the voice coil 1 to the two (2) first conducting pads 33 respectively further includes: fixing the front ends of the two tinsel wires 11 at an inclination angle θ to the two (2) first conducting pad 31 of the connecting terminal 3, and which are connected electrically by welding/soldering. That is, the extension direction of the third line segment C of the tinsel wires 11 and the vertical direction (or the extension direction of the first line segment A) forms an angle θ, wherein the θ is between 10~45 degrees. This makes the angle between the first line segment A and the second line segment B of the tinsel wires 11 different from the angle between the second line segment B and the third line segment C. In other words, the angle between the extension line of each line segments and the horizontal line may be not the same. The lengths of the first line segment A, the second line segment B and the third line segment C may be the same or different from each other, or only partially the same. In one embodiment, the first line segment A of each tinsel wire 11 is parallel to the third line segment C, and the first line segment A and the third line segment C extend in the same direction, such as extending downward as shown in FIG. 3. For example, the horizontal distance between the end points 111 of the two (2) first line segments A may be equal to the horizontal distance between the two end points 112.

In some different embodiments, please refer to FIG. 1 and FIGS. 6 to 7. The STEP of vertically assembling the voice coil 1 and the connecting terminal 3b or 3c to the bracket 2 further includes: STEP 21: placing the two extension arms 35 on armrest 26 respectively; and STEP 22: passing the two (2) fourth conducting pads 33b or 33c through the second holes 25.

Although the description of the above manufacturing method only takes FIG. 1, FIG. 6 and FIG. 7 as examples, those skilled in the art can make various modifications and changes after reading the embodiment of this disclosure. For example, the bending shape of the tinsel wires 11, and the locations of the first, second, third and fourth conducting pads, etc., all does not affect the manufacturing method of this application. On the contrary, the different embodiments of the various transducers mentioned above can be applied in the manufacturing method of this disclosure. Since different embodiments of various transducers have been introduced in detail before, the description of the embodiments of the manufacturing method will not be repeated.

According to the structural design of the present application, there can be a simpler method for manufacturing the transducer. As mentioned above, the manufacturing can be completed by stacking and assembling directly vertically from top to bottom. Therefore, the process of assembling the tinsel wires of the voice coil to the bracket is simpler, and the scrap may be reduced. Mass production can be optimized, particularly related to automated assembly thereby reducing manufacturing costs. It complies with the concepts of green environmental protection and sustainable management.

A number of implementations have been described. Nevertheless, it will be understood that additional modifications may be made without departing from the scope of the inventive concepts described herein. Although this disclosure has been described in considerable detail with reference to certain embodiments thereof, the invention may be variously embodied without departing from the spirit or scope of the invention. Therefore, the following claims should not be limited to the description of the embodiments contained herein in any way.

What is claimed is:

1. A transducer comprising:
   a bracket comprising a first hole located in a central area and a notch at an edge area and two support pieces located on both sides of the notch;
   a voice coil comprising a body and two tinsel wires extending from the body, wherein at least a part of the body is located within the first hole;

a connecting terminal comprising two first conducting pads, and the two tinsel wires disposed on and connected to the two first conducting pads respectively; and a damper, wherein the connecting terminal includes a board having two opposite sides, namely a first side and a second side, the board is located on the two support pieces and in the notch, and the two support pieces expose at least a portion of a bottom surface of the board, and the first side is fully exposed by the notch, and the first side is aligned with an outer surface of a cylindrical wall of the edge area to form a continuous surface, and the bracket comprises a steady disposed below the edge area and between the first hole and the edge area, at least a part of the damper is placed on the steady, and the two tinsel wires of the voice coil are located above the damper.

2. The transducer according to claim 1, wherein the notch comprises a blocking wall disposed between the connecting terminal and the body of the voice coil for stopping inwardly movement of the connecting terminal, and the connecting terminal may be kept positioned on the support pieces.

3. The transducer according to claim 2, wherein the blocking wall comprises two indentations located at an upper edge thereof, and the two tinsel wires pass through the two indentations respectively.

4. The transducer according to claim 2, wherein the second side is aligned with the blocking wall.

5. The transducer according to claim 1, wherein a contact surface between the two support pieces and the connecting terminal and a horizontal plane forms an inclination angle, and the connecting terminal may be placed inclinedly.

6. The transducer according to claim 1, wherein the connecting terminal comprises two second conducting pads, the two first conducting pads are disposed on one surface of two opposite surfaces of the board, and the two second conducting pads are disposed on the other one surface.

7. The transducer according to claim 1, wherein the connecting terminal comprises two third conducting pads extending outwardly from the board.

8. The transducer according to claim 1, wherein the bracket comprises a plurality of second holes and a plurality of armrests staggered with each other, the plurality of second holes are located between the steady and the edge area, and the plurality of armrests are spaced apart along the steady.

9. The transducer according to claim 8, wherein the connecting terminal comprises:

the two first conducting pads located on the board;

two extension arms extending from two opposite sides of the board respectively along the edge area; and two fourth conducting pads extending from the two extension arms respectively;

wherein the two extension arms are placed on the plurality of armrests respectively, and the two fourth conducting pads pass through out of the plurality of the second holes respectively.

10. The transducer according to claim 8, wherein the connecting terminal comprises:

two extension arms extending from two opposite sides of the board respectively along the edge area, the two first conducting pads located at two ends of the two extension arms respectively; and two fourth conducting pads extending from the two extension arms respectively;

wherein the two extension arms are placed on the plurality of armrests respectively, and the two fourth conducting pads pass through out of the plurality of the second holes respectively.

11. The transducer according to claim 1, wherein each tinsel wire comprises a first line segment, a second line segment and a third line segment, and an angle between the first line segment and the second line segment is different from an angle between the second line segment and the third line segment.

12. The transducer according to claim 10, wherein at least one of the first line segment, the second line segment or the third line segment are fixed on the first conducting pad of the connecting terminal, and an angle between the extension directions of the third line segment and the first line segment is about 10 to 45 degrees.

13. A manufacturing method of a transducer, wherein the transducer comprises a bracket, a voice coil, a damper and a connecting terminal including a board having two opposite sides, the two opposite sides including a first side and a second side, the bracket has a first hole located in a center area and a notch located in an edge area, and two support pieces located on both sides of the notch, the voice coil has a body and two tinsel wires extending from the periphery of the body of the voice coil, and the connecting terminal has two first conductive pads; the manufacturing method comprising:

electrically connecting the two tinsel wires to the two first conductive pads respectively; and vertically assembling the voice coil and the connecting terminal to the bracket;

wherein at least a part of the body is located within the first hole and at least a part of the board of the connecting terminal is located on the support pieces in the notch, and the two support pieces expose at least a portion of a bottom surface of the board, and the bracket comprises a steady disposed below the edge area and between the first hole and the edge area; and the step of vertically assembling the voice coil and the connecting terminal to the bracket comprising: vertically placing the damper onto the steady; vertically disposing the two tinsel wires above of the damper; and vertically placing the board into the notch wherein the first side of the board is fully exposed by the notch, and the first side is aligned with an outer surface of a cylindrical wall of the edge area to form a continuous surface.

14. The manufacturing method according to claim 13, wherein the notch comprises a blocking wall disposed between the connecting terminal and the body of the voice coil for stopping inwardly movement of the connecting terminal, and the connecting terminal is kept positioned on the two support pieces.

15. The manufacturing method according to claim 14, wherein the blocking wall comprises two indentations located at an upper edge thereof, and the two tinsel wires pass through the two indentations respectively.

16. The manufacturing method according to claim 13, wherein a contact surface between the two support pieces and the connecting terminal and a horizontal plane forms an inclination angle, and the connecting terminal may be placed inclinedly.

17. The manufacturing method according to claim 13, wherein the bracket comprises a plurality of second holes and a plurality of armrests staggered with each other, the plurality of second holes are located between the steady and the edge area, and the plurality of armrests are spaced apart along the steady.

18. The manufacturing method according to claim 17, wherein the connecting terminal comprises two extension arms and two fourth conducting pads, the two first conducting pads are located on the board, the two extension arms extend from two opposite sides of the board respectively along the edge area, the two fourth conducting pads extend from the two extension arms respectively; and the step of vertically assembling the voice coil and the connecting terminal to the bracket further comprising:

placing the two extension arms onto the plurality of armrests respectively; and passing the two fourth conducting pads through out of the plurality of second holes respectively.

19. The manufacturing method according to claim 17, wherein the connecting terminal comprises two extension arms and two fourth conducting pads, the two extension arms extend from two opposite sides of the board respectively along the edge area, the two first conducting pads are disposed at the two ends of the two extension arms respectively, and the two fourth conducting pads extend from the two extension arms respectively; and the step of vertically assembling the voice coil and the connecting terminal to the bracket further comprising:

placing the two extension arms onto the plurality of armrests respectively; and passing the two fourth conducting pads through out of the plurality of second holes respectively.

\* \* \* \* \*